June 24, 1941.     P. K. BEEMER     2,246,833
VEHICLE STEERING MECHANISM
Original Filed Jan. 19, 1934
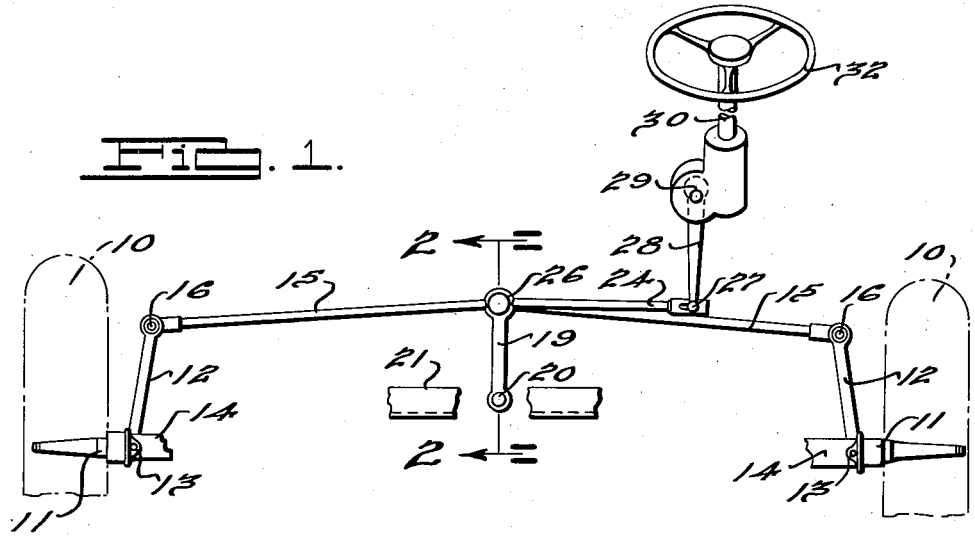
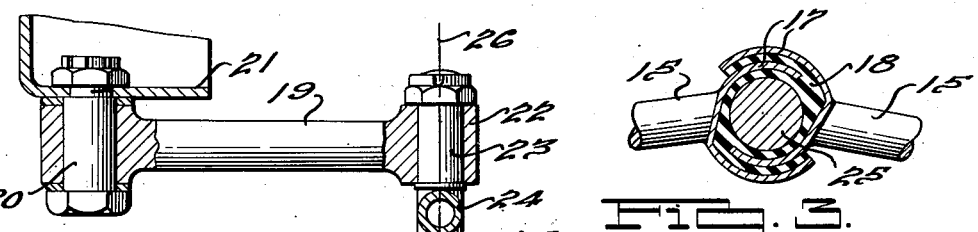
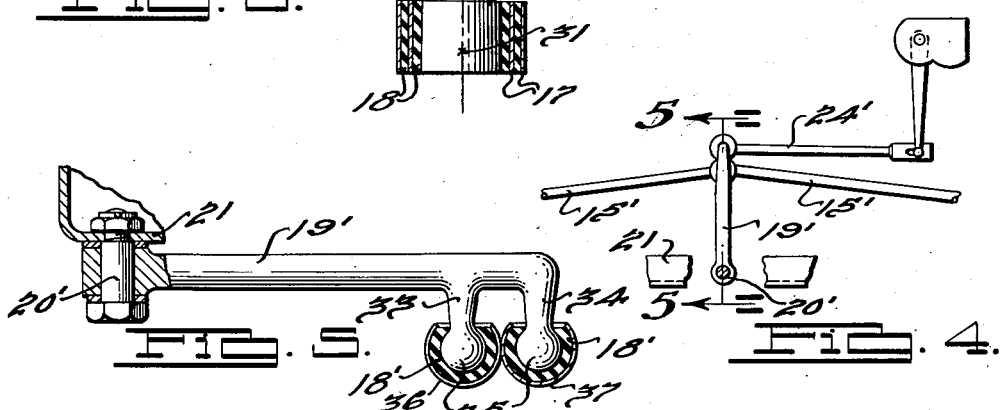
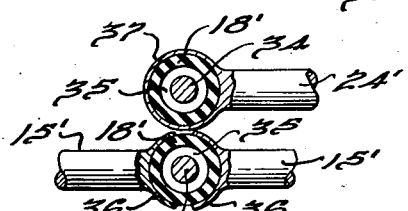
INVENTOR
Paul K. Beemer
BY
Harness, Dick, Pater V. Harris
ATTORNEYS.

Patented June 24, 1941

2,246,833

UNITED STATES PATENT OFFICE 2,246,833

VEHICLE STEERING MECHANISM

Paul K. Beemer, Inglewood, Calif., assignor to Chrysler Corporation, Highland Park, Mich., a corporation of Delaware Original application January 19, 1934, Serial No. 707,242. Divided and this application September 17, 1938, Serial No. 230,370

4 Claims. (Cl. 280—95)

This invention relates to motor vehicles and refers more particularly to improvements in steering mechanisms for such vehicles.

This application is a division of my Patent No. 2,154,558, dated April 18, 1939 which issued from my application Serial No. 707,242, filed January 19, 1934 and is directed particularly to my improved means of connecting the steering tie rod or tie rods with a steering force applying member.

One object of my invention is to provide improved tie rod connecting means which will transmit the steering forces from the force applying member to the tie rods while dampening objectionable vibrations and shocks which would otherwise be transmitted mostly from the road wheels to the force applying member and thence to the usual steering hand wheel where such vibrations are annoying to the vehicle driver. A further object is to provide a dampening means which will protect the steering mechanism itself in an improved manner against undue shocks and jolts.

Another object of my invention in a more limited aspect is to provide an improved dampening means, preferably in the form of a rubber body or equivalent non-metallic deformable mass of material, which is so arranged as to transmit steering forces therethrough to a pair of tie rods whereby a multiplicity of rubber bodies is rendered unnecessary. In addition I may also arrange the dampening thrust-transmitting rubber body so that it forms a common pivot support for the adjacent inner ends of the tie rods.

Further objects and advantages of my invention will be more apparent from the following illustrative description of several embodiments thereof, reference being had to the accompanying drawing in which:

Fig. 1 is a plan view of my steering system.

Fig. 2 is a sectional elevational view taken as indicated by line 2—2 of Fig. 1.

Fig. 3 is a detail sectional plan view at the connection of the inner ends of the tie rods.

Fig. 4 illustrates a modification of the Fig. 1 steering system.

Fig. 5 is a sectional elevational view taken as indicated by line 5—5 of Fig. 4.

Fig. 6 is a detail sectional plan view of the Fig. 4 arrangement further showing the connection at the inner ends of the tie rods.

Referring to the drawing, reference character 10 illustrates the front steerable wheels of the vehicle which is more fully shown in my copending application aforesaid. Each wheel is rotatably mounted on a steering spindle knuckle 11 having a rearwardly extending steering arm 12 for imparting steering movement to the wheel about the king pin 13 which mounts the knuckle on the axle, a portion of which is shown at 14.

Each axle 14 may be sprung independently of the other in any suitable manner and as the suspension system of my aforesaid copending application does not form any part of this invention, I have omitted the suspension from my present illustration especially as my steering system may be used to advantage with any desired type of wheel suspension.

The steering arms 12 are operated by a pair of tie rods 15 which are pivotally connected at their inner ends to accommodate rising and falling movements of wheels 10 and also to accommodate lateral shifting of the tie rods by movement of some suitable type of steering force transmitting member which thrusts through a body of insulating material in transmitting the steering force to the tie rods.

In the embodiment illustrated in Figs. 1 to 3 the outer end of each tie rod 15 has the customary ball and socket joint connection at 16 with a steering arm 12 and the inner end of each tie rod is formed with an approximately cylindrical socket portion 17. These sockets are overlapped in the direction of the lengths of tie rods 15 and are maintained spaced from each other by a body 18 of non-metallic deformable material, such as rubber composition.

An idler guide arm or link 19 is pivotally mounted by a pivot pin 20 on a cross member 21 of the vehicle frame and this link has a bearing 22 at its rear end for receiving a spindle 23 to which a drag link 24 is connected. The lower end of the spindle 23 is enlarged to provide a cylindrical bearing portion 25 spaced within the socket portions 17. The rubber body 18 is interposed between bearing 25 and each of the sockets 17 and also separates the sockets from each other. The rubber body 18 may be preferably molded in place and vulcanized to bearing 25 and sockets 17. It may thus be seen that the pitman 28 is connected directly to the tie rods 15 through the link means 23, 24.

The spindle 23 may rotate about its own axis 26 and about the axis of pin 20 but is not permitted other angular movement relative to the vehicle frame. Drag link 24 has its outer end connected by a ball and socket joint at 27 to the steering force transmitting pitman arm 28 operated through the usual gearing in housing 29 from the steering shaft 30.

Thrust from the pitman arm 28 is transmitted through drag link 24 to bearing 25 thereby acting through the vibration dampening body 18 to operate tie rods 15 and steer the wheels 10. The tie rods are universally mounted at their adjacent inner ends by the rubber body 18 which accommodates pivoting of each tie rod approximately about the common point 31 on axis 26. The resilient body 18 also serves to absorb and dampen shocks and vibrations tending to be transmitted from the wheels 10 through the tie rods 15 and drag link 24 and pitman arm 28 and shaft 30 to the hands of the vehicle driver, the upper end of shaft 30 carrying the customary steering hand wheel 32. The body 18 also prevents damaging shock transmission from the wheels 10 to the steering parts between hand wheel 32 and bearing 25.

It can be seen in Figs. 1, 2 and 3 that the rubber connects tie rods 15 directly to drag link 24 and thus is disposed so as to be subjected to very little angular deflection throughout the normal operating range of the steering linkage. Thus a flexible joint is obtained without the operator having to overcome the elastic resistance incident to twisting rubber joints through large angles.

In Figs. 4 to 6 the idler guide link 19' is swingingly mounted at 20' and carries the longitudinally spaced downwardly extending arms 33 and 34 each provided with a ball or spherical portion 35 respectively adapted to be connected to the tie rods 15' and to the drag link 24'. Each of the tie rods 15' and the drag link 24' are provided with generally correspondingly formed sockets 36 and 37 respectively, the sockets being of spherical shape and admitting the spherical ends 35.

Deformable bodies 18' of rubber or equivalent are interposed between spherical members 35 and each of the sockets 36 and 37, and preferably these bodies 18' are molded in place and vulcanized to both the ball ends 35 and sockets 36 and 37.

The operation is substantially similar to that of the Fig. 1 arrangement in that the deformable bodies 18' take up or damp vibration transmitted from the ground wheels, to prevent the transmission of shock to the steering mechanism and hand wheel. The rubber bodies 18' yield to permit angular movement of tie rods 15' as before. In this instance the drag link is pivoted to link 19' by a rubber body 18' separately from the pivotal connection of tie rods 15' to link 19'.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a joint for vehicle steering mechanism, the combination of a pair of tie rods; a pitman adapted to transmit steering force to said tie rods; and a link directly connecting adjacent ends of said tie rods with said pitman, said link connecting means including a body of non-metallic deformable material pivotally supporting said tie rod ends and adapted to dampen shock transmission from said tie rods to said pitman.

2. In a joint for vehicle steering mechanism, the combination of a pair of tie rods each having a socket portion at one end thereof; a member adapted to transmit steering force to said tie rods; and a single body of rubber disposed between said member and said socket portions and serving to transmit the steering force from said member to said tie rods, said body acting to dampen shock transmission from said tie rods to said member.

3. In a vehicle steering mechanism, in combination, a pair of tie rods disposed in a common horizontal plane and having spaced apart end portions overlapping one another in the direction of their lengths; a member adapted to transmit steering force to said tie rods; and a body of rubber connecting said member with said tie rods, at least a portion of said body being disposed in the space between said tie rod end portions.

4. In a vehicle steering mechanism, in combination, a pair of tie rods disposed in a common plane and having spaced apart spherical end portions movable about a common center; a member adapted to transmit steering force to said tie rods; and a body of rubber connecting said member with said tie rods, at least a portion of said body being disposed in the space between said spherical tie rod end portions.

PAUL K. BEEMER.